United States Patent [19]
Turek et al.

[11] Patent Number: 6,021,439
[45] Date of Patent: Feb. 1, 2000

[54] INTERNET QUALITY-OF-SERVICE METHOD AND SYSTEM

[75] Inventors: John J. E. Turek, South Nyack, N.Y.; Brian Jay Vetter, Austin, Tex.

[73] Assignee: International Business Machines Corporation, Armonk, N.Y.

[21] Appl. No.: 08/970,411

[22] Filed: Nov. 14, 1997

[51] Int. Cl.[7] .............................. G06F 11/30; G06F 13/00
[52] U.S. Cl. .................... 709/224; 709/218; 713/202
[58] Field of Search ..................................... 709/224, 218, 709/225, 226; 370/450; 713/202

[56] References Cited

U.S. PATENT DOCUMENTS

| | | | |
|---|---|---|---|
| 5,712,979 | 1/1998 | Graber et al. | 709/224 |
| 5,727,129 | 3/1998 | Barrett et al. | 706/10 |
| 5,790,785 | 8/1998 | Klug et al. | 713/202 |
| 5,796,952 | 8/1998 | Davis et al. | 709/224 |
| 5,892,917 | 4/1999 | Myerson | 709/224 |

*Primary Examiner*—Robert B. Harrell
*Assistant Examiner*—Kenneth R. Coulter
*Attorney, Agent, or Firm*—Jeffrey S. LaBaw; David H. Judson

[57] ABSTRACT

A method of identifying quality-of-service problems associated with a given Web server in a computer network. The Web server includes a Web page having a token declaring that quality-of-service information is to be collected. When the Web page is received at a Web client having the capability to collect the information, an indication is provided to the Web client user that the information is being collected. The collected quality-of-service information is then uploaded, preferably without any information identifying the user, either to the Web server that served the page or to a management server.

31 Claims, 3 Drawing Sheets

INTERNET QUALITY-OF-SERVICE METHOD AND SYSTEM

BACKGROUND OF THE INVENTION

1. Technical Field

The present invention relates generally to computer networks and more particularly to a method and system for monitoring and collecting quality-of-service data in a client-server computer network such as the Internet.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Web site operators desire to monitor the quality-of-service they provide to Web clients in order to address and rectify service problems. To this end, various solutions have been proposed and some have been implemented, with mixed results. One approach is to place dedicated monitors or machines at a selected plurality (e.g., 30–40) Internet Service Provider (ISP) or other locations throughout the Internet and to collect various types of usage statistics that are then sold or distributed back to Web site operators interested in such information. The information measured by these monitors, however, may only represent only a small fraction of the total paths used to connect to any given large server. In addition, such monitors are useless for resolving questions about the quality-of-service (e.g., server response times) for requests issued by way of an ISP that is not connected to the set of monitors.

Another approach that has been suggested is to reward or provide incentives for Web client users to monitor their own usage and to return those collected statistics back to a central collection point for subsequent distribution. That approach has certain drawbacks as well, most notably the inability to achieve statistical significance given the sample size and characteristics. Another drawback is the requirement that the user's identity must be maintained by the monitoring service in order to provide the award or incentive. Once the user's identity is revealed to the monitoring service, demographic information is often provided to third parties for other, perhaps unintended uses (e.g., to provide targeted advertisements). Many users are not prepared to trade their privacy for such discounts or incentives.

There remains a need to provide a technique by which Web site operators can monitor the quality-of-service being provided from their sites while users (that generate the raw data for such statistics) are assured that such information is being collected anonymously. The present invention solves this problem.

SUMMARY OF THE INVENTION

It is thus a primary object of the present invention to enable Web site operators to monitor the quality-of-service (Q-o-S) obtained from their sites.

It is another primary object of this invention to provide a Web site Q-o-S monitoring service that protects the privacy of individuals who generate raw data used to evaluate a given quality-of-service metric.

It is still another important object of this invention to provide a mechanism that protects a content host from having information about its site divulged to third parties without its consent.

It is another important object of this invention to manage the administration, collection and use of quality-of-service information in an open computer network environment.

In one particular embodiment, a Web site desires to obtain quality-of-service information about its operations. A Web client connectable to that Web site has the capability of collecting quality-of-service information. A Web page for which the quality-of-service information is collected is a "Q-o-S enabled" page. A user of an instrumented Web client is preferably notified that a given page is "Q-o-S enabled" by the display (e.g., in the form of a graphic element or text) of information that indicates that the Q-o-S statistics will be collected with respect to that page. Such "Q-o-S enabled" information may take the form of a seal verifying to the user that the Q-o-S information will be collected and returned to the instrumented Web server (either directly or through a proxy) anonymously, i.e. without revealing the user's identity, clickstream or other personal information. Thus, the user of the instrumented Web client is assured that the Q-o-S information is being collected and used by an instrumented Web server merely to address and rectify quality-of-service issues.

In one preferred embodiment of this invention, a method of identifying quality-of-service problems associated with a given Web server in a computer network is described. The Web server includes a Web page having a token (or other identifying information such as a markup language "tag") declaring that quality-of-service information is to be collected. When the Web page is received at a Web client having the capability to collect the information, an indication is provided to the Web client user that the information is being collected. The collected quality-of-service information is then uploaded, preferably without any information identifying the user, either to the Web server that served the page or to another apparatus that acts as a proxy (on behalf of the Web server) for collecting such information.

The particular quality-of-service information may be quite varied. Typically, however, the information includes one or more "exception" events such as a broken hypertext link, a server response time exceeding some threshold value, an Internet delay exceeding some predetermined value, an applet byte code verification exceeding some threshold time period, or the like. The quality-of-service information may include generic information about the particular user's experience with the Web page (e.g., how long the user spends browsing the page, which links are activated, which links are not used, etc.), although, as previously noted, personal information preferably is not recorded. The particular nature and type of the quality-of-service information may vary from one Web client to another, and from one Web server to another. As noted above, however, preferably the Web server notifies the Web client (and thus the user) of its intention to monitor its quality-of-service and that such Q-o-S will be monitored, preferably in an anonymous manner.

In accordance with another aspect of the invention, a quality-of-service monitoring system is described for use in a computer network. The system includes at least one instrumented Web server supporting a quality-of-service (Q-o-S) enabled Web page, and at least one instrumented Web client having a Web browser. The Web client includes means responsive to receipt of the Q-o-S enabled Web page (a) for collecting quality-of-service information, (b) for notifying a user of the Web client that the quality-of-service information is being collected, and (c) for uploading the collected quality-of-service information back onto the computer network (e.g., back to the instrumented Web server) without revealing information identifying the user. The system may also include another management server that receives and stores such information on behalf of other instrumented Web servers. The management server may then be used in such a system to notify a given Web server of a Q-o-S problem associated by an instrumented Web client with respect to a Q-o-S enabled page.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
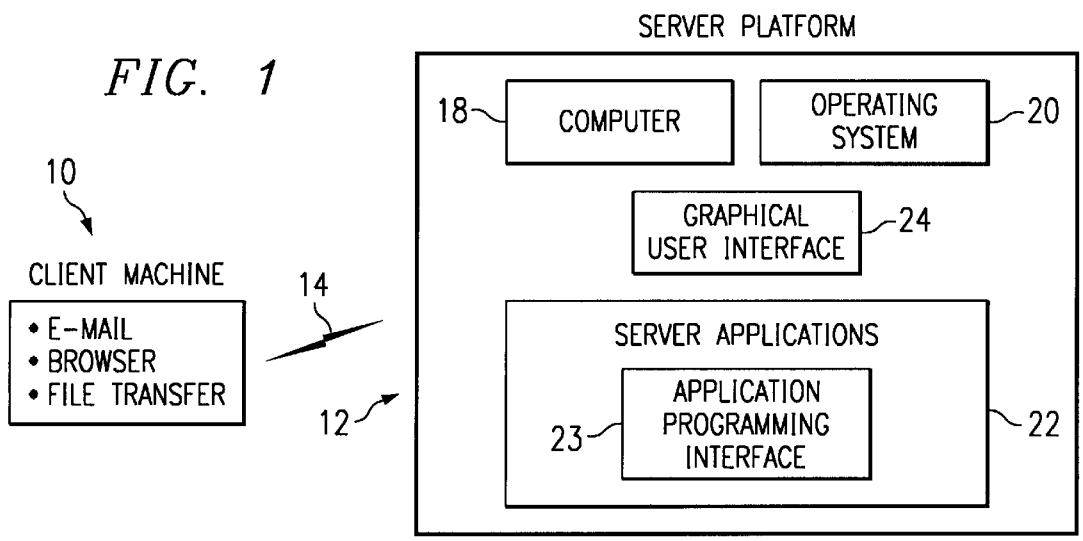
FIG. 1 is a representative system in which the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. The Web server platform (sometimes referred to as a "Web" site) supports files in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins.

As is well-known, the Web server accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

Figure 2:
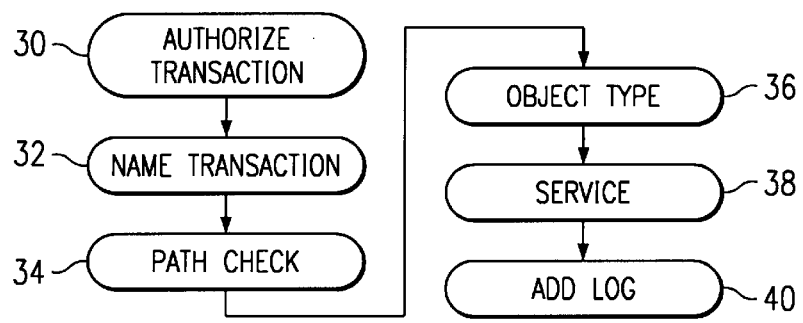
FIG. 2 is a flowchart illustrating the conventional processing associated with an HTTP request from the Web client to the Web server shown in FIG. 1.

The time spent carrying out the various functions of FIG. 2 (namely, the time spent by the Web server serving the HTTP request) is known as the server processing time, or server "response" time. Server response time provides some indication of the "quality-of-service" being provided by the Web server. Another type of Q-o-S response time metric is the "response time" that a user experiences with respect to a given action taken at the client machine, e.g., activating a link and receipt of the request document.

Figure 3:
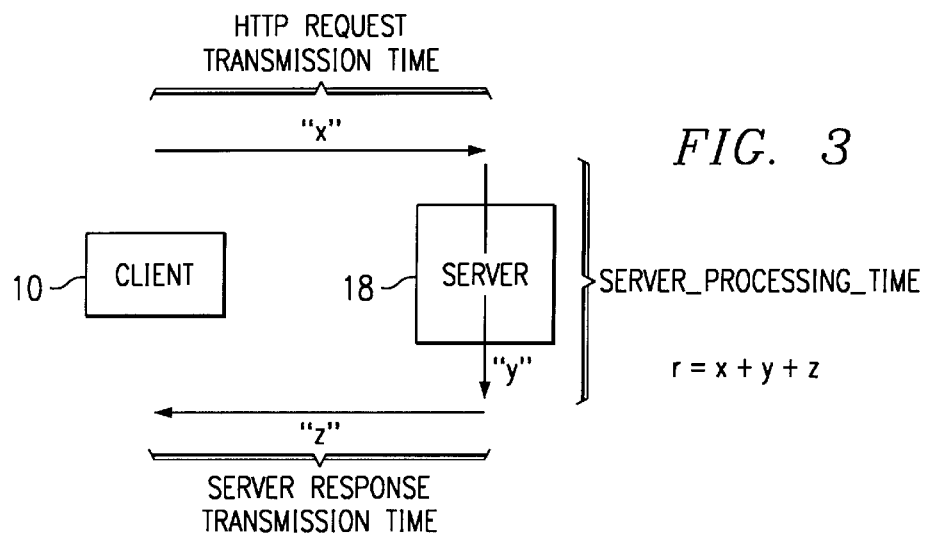
FIG. 3 is a simplified timing diagram illustrating several quality-of-service metrics associated with a typical HTTP GET request issued from a Web client to a Web server.

FIG. 3 illustrates the various components that comprise the "response time" of a given HTTP request. It should be appreciated that this illustration is quite simplified. In particular, typically a Web page comprises a base HTML document and a plurality of embedded objects (e.g., .gif files, .jpeg files, etc.), each of which are retrieved using its own HTTP request. For purposes of discussion, it is assumed that the Web page is retrieved using a single HTTP request, although one of ordinary skill will understand that, in the usual case, multiple such requests are required to pull the page from the server.

A first time "x" represents the time to transfer the HTTP request (usually a GET or POST request) from the Web client to the Web server. A second time "y" represents the server processing time, which was described above with respect to the flowchart of FIG. 2. A third time "z" then represents the time to transfer a specified event in the response to the HTTP request back to the Web client. The specified event may be first packet return, last HTML byte, last .gif byte, or some intermediate event within the transfer. Thus, the response time "r" equals "x+y+z."

Another quality-of-service metric, the so-called "Internet delay," is that portion of the response time associated with the actual transmission over the Internet itself (as opposed to the time spent within the server for processing). Internet delay is then the value "x+z".

The present invention provides a method and system for enabling Web sites to monitor these and other quality-of-service metrics. A preferred system for implementing this invention is illustrated in the block diagram of FIG. 4. The representative system includes at least one Web site 50 that desires to obtain quality-of-service information about its operations. For convenience, such a Web site is sometimes referred to as an "instrumented" Web server or site. A particular Web site 50 may subscribe to the service provided by the system by paying a fee. The system also includes at least one Web client 52 that (as will be described) has the capability of collecting the quality-of-service information. A client having such capability is sometimes referred to herein as an "instrumented" Web client.

Figure 4:
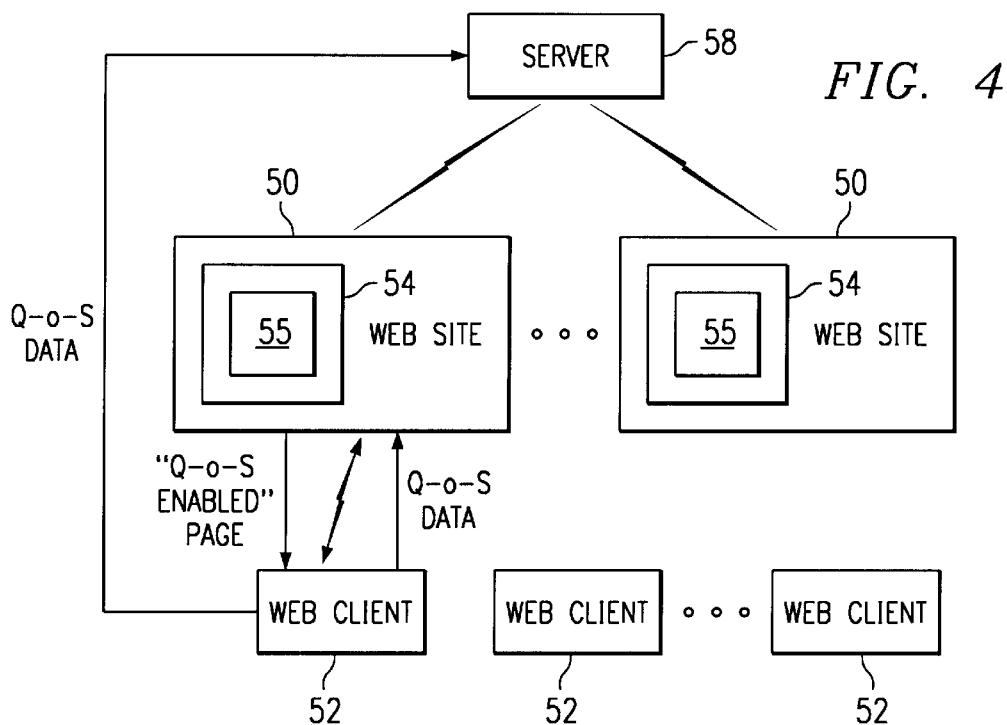
FIG. 4 is a block diagram of a quality-of-service monitoring system according to the teachings of the present invention.

As is also illustrated in FIG. 4, a particular Web page 54 supported on the instrumented Web site 50 is identified as a page which the quality-of-service information will be collected. Such a page is referred to as an "Q-o-S enabled" page. A Q-o-S enabled page includes a token 55 (which may be an embedded markup tag, or the like) that serves several purposes. First, the token identifies the page to the Web client as a "Q-o-S enabled" page. This token, in effect, identifies the Web site's intent or desire to collect to some statistics about the nature of its quality-of-service. The token itself may also function as an "identifier" that is displayed, preferably together with the Web page, so that the user is thus made aware that such quality-of-service statistics are being collected. In this way, the identifier may represent a seal, certification or guarantee that the Web site operator is one that is concerned with and is attempting to address service problems that are experienced by the instrumented Web client.

Thus, according to the present invention, a user of the 52 instrumented Web client is preferably notified that a given page is "Q-o-S enabled" by the display (e.g., in the form of a graphic element or text) of information that indicates that the Q-o-S statistics will be or are being collected with respect to that page. According to another feature of the invention, as will be further described, the Q-o-S statistics are preferably collected anonymously, i.e. without revealing the user's identity, clickstream or other personal information. Thus, the token may directly or indirectly provide an indication to the user of the instrumented Web client that the Q-o-S information is being collected and used by an instrumented Web server merely to address and rectify quality-of-service issues, and not for other reasons.

The token provides another important security advantage. By embedding the token in a Web page according to the present invention, the Web site operator is assured that information about its site cannot be divulged to a third party without its consent. This is advantageous for sites that are located within a protected domain, such as within a firewall, or are password-protected. In such case, the site has an interest in restricting Q-o-S information from being freely-provided to a third party. By using the present invention, only the owner or operator of the site allows the Q-o-S data to be divulged to the third party.

Referring back to FIG. 4, the system may also include one or more management servers 58 to which one or more instrumented Web servers 52 connect to obtain the service. A proxy server 58 collects Q-o-S information on behalf of multiple Web servers that subscribe to the service. The use of a management server is advantageous because, by their very nature, quality-of-service problems may indicate some core problem with the operations of the instrumented server itself. That problem may inhibit the Web server from obtaining the Q-o-S information directly from the instrumented Web client. Thus, by using the management server 58 to store and maintain the Q-o-S statistics (for one or more instrumented Web servers), and to deliver "outage" or other like requests to the affected server, the Q-o-S information can be provided in a persistent manner. Moreover, the management server enables the system to be easily-scaled and centrally-managed.

Figure 5:
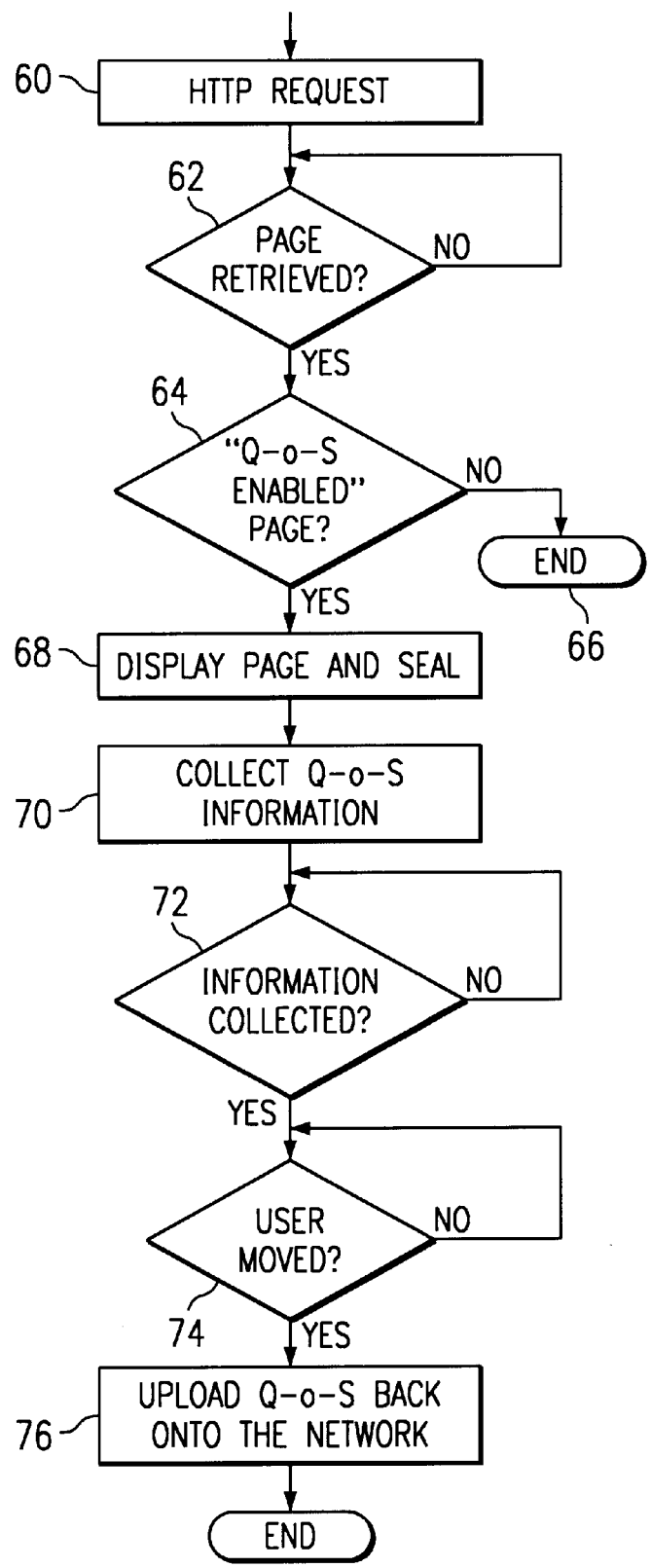
FIG. 5 is a flowchart illustrating a simplified method of evaluating the quality-of-service associated with a Q-o-S enabled Web page according to the invention.

A simplified flowchart of a method of identifying quality-of-service problems associated with the instrumented Web server is illustrated in FIG. 5. This processing takes place at the client machine. As noted above, the Web server includes a Web page having a token declaring that quality-of-service information is to be collected. The method begins at step 60 (in this illustrative example) in response to an HTTP GET request. The method may also be implemented in response to other HTTP service requests. At step 62, a test is performed to determine whether the requested page has been downloaded. If the outcome of the test at step 62 is negative, the routine cycles and waits for the page. If the outcome of the test at step 62 is positive, the routine continues at step 64 by testing whether the downloaded page is "Q-o-S enabled." Typically, step 64 involves parsing the received HTML stream comprising the document and searching for the token. The token may be encoded or encrypted in any known fashion to provide the aforementioned advantages. If the received page is not Q-o-S enabled, the routine branches to step 66 and terminates. In such event, the page is displayed by the browser in the usual way and no Q-o-S statistics are collected.

If, however, the outcome of the test at step 64 indicates that the received page is "Q-o-S enabled," the routine continues at step 68 to display the page, together with an appropriate identifier. As discussed above, the identifier (which may be the token itself or some facsimile thereof) certifies to the user that the page is "Q-o-S enabled" and protects the content host from having information about its site divulged to third parties without consent. The routine then continues at step 70 to collect the quality-of-service information. It should be appreciated that collection of the Q-o-S information, in effect, may have already begun when the page was first requested or upon receipt of the first packet of the requested page. As one of ordinary skill will appreciate, the logic shown in the flowchart is merely illustrative and the particular Q-o-S metric will determine how and when the data is actually collected. Typically, such collection is effected as a background process. At step 72, a test is done to determine if the Q-o-S information has been collected. Again, the outcome of this test will depend on the type of Q-o-S metric. If the data collection is not finished, the routine cycles. If, however, the outcome of the test at step 72 is positive, the routine continues.

At step 74, a test is performed to determine whether the user has taken a predetermined action (e.g., closed the browser, navigated to a new page, etc.). These actions are merely illustrative. If the outcome of the test at step 74 is negative, the routine cycles. If, however, the outcome of the test at step 74 indicates that the user has taken the predetermined action, the routine continues at step 76 with the Web client uploading the collected information back onto the computer network. Preferably, the collected quality-of-service information is uploaded without any information identifying the user. This ends the client-side processing.

The particular quality-of-service information may be quite varied. Typically, however, the information includes one or more "exception" events such as a broken hypertext link, a server response time exceeding some threshold value, an Internet delay exceeding some predetermined value, an applet byte code verification exceeding some threshold time period, or the like. The quality-of-service information may also include generic information about the particular user's experience with the Web page (e.g., how long the user spends browsing the page, which links are activated, which links are not used, etc.), although, as previously noted, personal information preferably is not recorded.

The particular nature and type of the quality-of-service information may vary from one instrumented Web client to another, and from one instrumented Web server to another, or across multiple pages supported on a single server. The token (or tag, or other such mechanism) preferably includes one or more "attributes" that are set to identify the particular exception event or the like to be monitored. Any other suitable mechanism may be used to collect the desired statistics.

As noted above, an instrumented Web server preferably notifies the instrumented Web client (and thus the user) of its intention to monitor its quality-of-service and that such Q-o-S will be monitored, preferably in an anonymous manner.

The manner in which the particular quality-of service data is collected depends on the Q-o-S metric. Thus, for example, a representative exception event may be the expiration of a timer before a given page element (such as a .gif file) has been retrieved from the server. The logic to carry out this function is straightforward. Thus, for example, when the base HTML page is retrieved, the timer is initiated and continually tested against a threshold. If the page element is received, the timer is reset. If the timer expires, the exception event is logged. Other Q-o-S metrics will require their own specific processing, although the particular details of such processing do not form part of the present invention.

Moreover, one of ordinary skill will appreciate that the particular technique by which the quality-of-service data is uploaded to the management server or the instrumented Web server may be quite varied. One particular advantageous technique is to use sequential HTTP requests for this purpose, with a second HTTP request passing end user response time information associated with a first HTTP request, all as described in copending application Ser. No. 08/924,986, filed Aug. 8, 1997, entitled "WORLD WIDE WEB END USER RESPONSE TIME MONITOR", which is assigned to the assignee of the present application. That application, which is incorporated herein by reference, also describes a convenient technique for calculating the end-to-end user response time Q-o-S metric.

Thus, according to the invention, a quality-of-service monitoring service is provisioned in the computer network using at least one instrumented Web server supporting a quality-of-service (Q-o-S) enabled Web page, and at least one instrumented Web client having a Web browser. A management server (e.g., a proxy) may be used to manage the service, and a fee may be charged for this administration. The Web client includes appropriate program control means responsive to receipt of the Q-o-S enabled Web page (a) for collecting quality-of-service information, (b) for notifying a user of the Web client that the quality-of-service information is being collected, and (c) for uploading the collected quality-of-service information back onto the computer network (e.g., back to the instrumented Web server) without revealing information identifying the user. This functionality may be built into the browser directly, or it may be provided via a plug-in, a standalone Java application or a network-loaded Java applet. A preferred implementation is provided through the browser application programming interface (API). Generalizing, the client software is simply a computer program product implemented in a computer-readable medium or otherwise downloaded to the Web client over the computer network.

Figure 6:
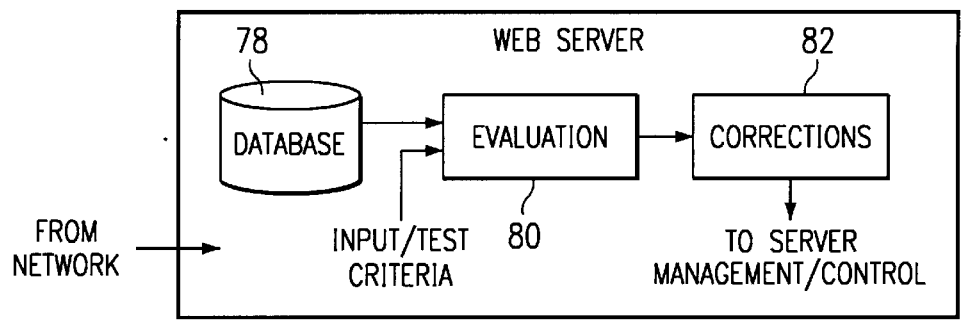
FIG. 6 is a block diagram of an instrumented Web server.
Figure 7:
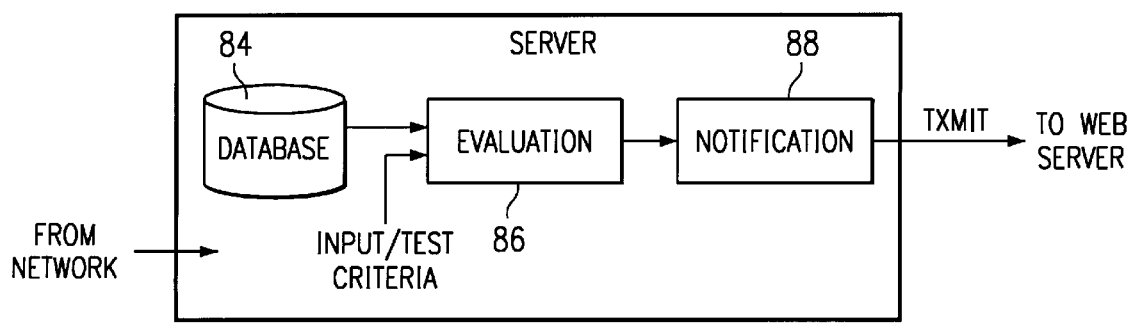
FIG. 7 is a block diagram of a proxy server for use in the quality-of-service monitoring system.

In addition to the functions implemented at the client machine, the invention also contemplates a "server" piece or pieces. FIG. 6 is a block diagram showing the various components implemented on the instrumented Web server. FIG. 7 is a block diagram showing the various components implemented in the management or other server (if used). As seen in FIG. 6, the Web server includes a suitable storage or database 78 for storing the quality-of-service information uploaded from client machines. The information is preferably stored in a relational manner or in any other convenient fashion. Information obtained from the database 78 is evaluated against one or more threshold(s) (depending on the Q-o-S metric involved) by an evaluation mechanism 80. Based on the threshold or some other criteria, the evaluation mechanism 80 determines whether a given quality-of-service problem has been experienced with respect to the Web page. If so, the server includes appropriate correction means 82 for taking a predetermined action to rectify the given quality-of-service problem.

In the management server implementation shown in FIG. 7, the server manages the quality-of-service information on behalf of one or more instrumented Web servers, perhaps for a service fee. Alternatively, the management server is used to collect the Q-o-S information on behalf of a set of instrumented Web servers, and a central controller located elsewhere in the network provides analysis (and, if desired, distribution and/or publication, e.g., for a fee) of such data.

In this implementation, the server piece also includes a storage or database 84 for storing the quality-of-service information uploaded onto the network by the client machines. Similar information is collected on behalf of all subscribed instrumented Web servers associated with the service. The management server also includes evaluation mechanism 86 for evaluating the quality-of-service information to determine whether a given quality-of-service problem has been experienced with respect to the served Web page in question. A notification mechanism 88 is responsive to inputs received from the evaluation mechanism for notifying the instrumented Web server (i.e. the server that served the given Web page) of the given quality-of-service problem.

One of the preferred implementations of the scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

1. A Web page formatted according to a markup language and supported on a content host, the content host connected in a computer network, comprising:
    a base HTML document; and
    a token restricting given information from being divulged to a third party without the content host's consent, wherein the given information is data about a given quality-of-service metric associated with the content host collected as the Web page is pulled across the computer network.

2. A method of evaluating quality-of-service over a computer network, the computer network having a Web client running a browser and a plurality of servers that support Web pages, comprising the steps of:
    downloading a Web page from a given server to the Web client, the Web page including a token declaring to the browser that quality-of-service information is to be collected;
    responsive to receipt of the Web page including the token, collecting quality-of-service information at the Web client; and
    uploading the collected quality-of-service information from the Web client to a given location for subsequent use.

3. The method as described in claim 2 wherein the step of collecting quality-of-service information at the Web client includes logging one or more exception events.

4. The method as described in claim 3 wherein the exception events include a broken link.

5. The method as described in claim 3 wherein the exception events include a measured Internet response time greater than a predetermined threshold.

6. The method as described in claim 3 wherein the exception events include a measured applet download time greater than a predetermined threshold.

7. The method as described in claim 2 further including the step of displaying an indication to a user of the Web client that the Web page includes the token and that the quality-of-service information is being collected with respect to the Web page.

8. The method as described in claim 7 wherein the quality-of-service information is uploaded to the given location without information identifying the user.

9. The method as described in claim 2 wherein the given location is the given server from which the Web page was downloaded.

10. The method as described in claim 2 wherein the given location is a management server at which quality-of-service information is compiled.

11. The method as described in claim 10 further including the step of having the management server notify the given server of an exception event.

12. The method as described in claim 2 wherein the computer network is the Internet.

13. A method of managing quality-of-service provided by a given server in a computer network having a client running a browser, comprising the steps of:
    downloading an object from the given server to the client, the object including a token declaring to the browser that quality-of-service information is to be collected;
    responsive to receipt of the Web page including the token, collecting quality-of-service information at the Web client;
    uploading the collected quality-of-service information from the Web client to a management server; and
    having the management server provide a notification about a given quality-of-service.

14. The method as described in claim 13 wherein the collected quality-of-service is uploaded to the management server without information identifying a user of the Web client.

15. The method as described in claim 13 further including the step of displaying on the browser an indication to a user of the Web client that the quality-of-service information is being collected with respect to the Web page.

16. A computer program product in a computer-readable medium for use in a Web client having a browser for monitoring quality-of-service available from a given Web server in a computer network, comprising:
    means, responsive to receipt at the Web client of a Web page from the given Web server, for determining whether quality-of-service information is to be collected; and
    means, responsive to the determining means, for collecting the quality-of-service information; and
    means, responsive to the collecting means, for uploading the collected quality-of-service information to a given location in the computer network.

17. The computer program product as described in claim 16 wherein the determining means includes means for identifying a token associated with the Web page, wherein the token declares to the browser that the quality-of-service information is to be collected.

18. The computer program product as described in claim 17 further including means for displaying an indication to the user that the Web page has the token.

19. The computer program product as described in claim 16 wherein the collecting means includes means for masking from the collected quality-of-service information given data identifying a user of the Web client.

20. A computer for use as a client in a computer network having a Web server that supports Web pages, at least one Web page including a token associated with a quality-of-service monitoring program, comprising:
    a processor having an operating system associated therewith;
    a Web browser; and
    means associated with the Web browser for monitoring quality-of-service from the Web server, comprising:
        means, responsive to receipt by the browser of the Web page including the token, for collecting the quality-of-service information; and means, responsive to the collecting means, for uploading the collected quality-of-service information to a given location in the computer network.

21. The computer as described in claim 20 wherein the quality-of-service monitoring means further includes means for displaying an indication to the user that the Web page has the token.

22. The computer as described in claim 20 wherein the collecting means includes means for masking from the collected quality-of-service information given data identifying a user of the Web client.

23. The computer as described in claim 20 wherein the quality-of-service monitoring means is a browser plug-in.

24. The computer as described in claim 20 wherein the quality-of-service monitoring means is an applet running on the browser.

25. The computer as described in claim 20 wherein the quality-of-service information includes a set of one or more exception events.

26. A server running in a computer network having a plurality of instrumented Web servers that desire to monitor their quality-of-service, at least one instrumented Web server including a Web page having a token declaring an intention to collect quality-of-service information, the server comprising:

means, responsive to receipt of quality-of-service information about the Web page uploaded from one or more Web clients, for storing the quality-of-service information;

means for evaluating the quality-of-service information to determine whether a given quality-of-service problem has been experienced with respect to the Web page; and means, responsive to the evaluating means, for providing a notification of a given quality-of-service.

27. A Web server supporting a Web page, the Web page having associated therewith a token declaring an intention to collect quality-of-service information, comprising:

means, responsive to receipt of quality-of-service information about the Web page uploaded from one or more Web clients, for storing the quality-of-service information;

means for evaluating the quality-of-service information to determine whether a given quality-of-service problem has been experienced with respect to the Web page; and means, responsive to the evaluating means, for taking a predetermined action to rectify the given quality-of-service problem.

28. A quality-of-service monitoring system for use in a computer network, comprising:

a first instrumented Web server supporting a quality-of-service (Q-o-S) enabled Web page; and at least one instrumented Web client having a Web browser and including means responsive to receipt of the Q-o-S enabled Web page for collecting quality-of-service information, and for uploading the collected quality-of-service information back onto the computer network.

29. The quality-of-service monitoring system as described in claim 28 wherein the means responsive to receipt of the Q-o-S enabled Web page further includes means for notifying a user of the Web client that the quality-of-service information is being collected.

30. The quality-of-service monitoring system as described in claim 28 wherein the uploading means uploads the collected quality-of-service information back to the first instrumented Web server without revealing information identifying the user.

31. The quality-of-service monitoring system as described in claim 28 further including:

a second instrumented Web server supporting a quality-of-service (Q-o-S) enabled Web page; and at least one server for receiving collected quality-of-service information uploaded from one or more instrumented Web clients and including means for providing a notification to one of the first and second instrumented Web servers.

* * * * *